United States Patent [19]
Sakai et al.

[11] Patent Number: 6,152,310
[45] Date of Patent: Nov. 28, 2000

[54] POWDER SUPPLY SYSTEM AND POWDER SUPPLYING UNIT USED IN THE SYSTEM

[75] Inventors: Yoshitaka Sakai; Masao Kikuchi, both of Utsunomiya, Japan

[73] Assignee: Rheon Automatic Machinery Co., Ltd., Tochigi-Ken, Japan

[21] Appl. No.: 09/192,265

[22] Filed: Nov. 16, 1998

[51] Int. Cl.⁷ .................... B04C 5/26; B04C 5/30
[52] U.S. Cl. ............... 209/712; 209/142; 209/143; 209/710; 209/711; 406/129; 222/64; 222/368
[58] Field of Search .............. 222/368, 64, 548, 222/553; 406/79, 129; 209/142, 143, 710, 711, 712

[56] References Cited

U.S. PATENT DOCUMENTS

| | | | |
|---|---|---|---|
| 657,998 | 9/1900 | Williams | 209/143 |
| 839,342 | 12/1906 | Vail | 209/143 |
| 1,669,084 | 5/1928 | Grindle . | |
| 2,087,645 | 7/1937 | Hermann | 209/144 |
| 2,800,252 | 7/1957 | Wahl | 222/55 |
| 3,693,840 | 9/1972 | Starr | 222/193 |
| 4,158,427 | 6/1979 | Hegge | 222/317 |
| 4,285,448 | 8/1981 | Group | 222/613 |
| 4,307,822 | 12/1981 | Hardesty | 222/352 |
| 4,526,678 | 7/1985 | Myhern et al. | 209/2 |
| 4,669,921 | 6/1987 | Flament et al. | 406/14 |
| 4,715,315 | 12/1987 | Burford | 118/684 |
| 5,290,431 | 3/1994 | Cunningham | 208/164 |
| 5,423,455 | 6/1995 | Ricciardi et al. | 222/1 |
| 5,669,741 | 9/1997 | Ono et al. | 406/79 |
| 5,713,494 | 2/1998 | Kaiju et al. | 222/199 |
| 5,806,441 | 9/1998 | Chung | 110/185 |
| 5,855,671 | 1/1999 | Scherping et al. | 118/13 |
| 5,906,854 | 5/1999 | Scherping et al. | 426/519 |
| 5,927,558 | 7/1999 | Bruce | 222/185.1 |
| 5,927,908 | 7/1999 | Kikuchi et al. | 406/129 |

FOREIGN PATENT DOCUMENTS

| | | | |
|---|---|---|---|
| 63-272720 | 11/1988 | Japan | B65G 53/56 |

*Primary Examiner*—Donald P. Walsh
*Assistant Examiner*—David A Jones
*Attorney, Agent, or Firm*—Sughrue, Mion, Zinn, Macpeak & Seas, PLLC

[57] ABSTRACT

A powder supply system including a powder replenishment device as a powder source, a suction device and a plurality of powder supply units connected in series. Each of the powder supply units sprinkles powders toward an object mounted on each processing device. An upstream end powder supply unit is fluidly connected to the powder replenishment device, and a downstream end powder supply unit is fluidly connected to the suction device. A suction force generated by the suction device sucks powders from the powder replenishment device through the powder supply units, and powders are successively accumulated in the powder supply units in the order from the upstream end powder supply unit to the downstream end powder supply unit. A powder sensor is provided between the rearmost powder supply unit and the suction device. If all powder supply units are filled with powders, residual powders are discharged out of the downstream end powder supply unit. If the sensor detects the powder, operation of the suction device and the powder replenishment device is stopped.

14 Claims, 7 Drawing Sheets

POWDER SUPPLY SYSTEM AND POWDER SUPPLYING UNIT USED IN THE SYSTEM

BACKGROUND OF THE INVENTION

The present invention relates to a powder supply system for supplying powder, and more specifically, to the powder supply system for replenishing powder in a plurality of powder supply units.

Conventionally, a plurality of powder supply units for supplying powder at various stages along a production line have been provided at different locations along the production line. For example, in a production line such as a line for producing bread, a plurality of powder supply units are provided each in association with each processing device, so that powders in the powder supply unit are sprinkled on the surface of dough at the processing device.

According to a conventional powder supply system, a powder replenishment device or a powder replenishment device having a pressure source has been provided for supplying powder to each one of the plurality of powder supply units to replenish powder in the powder supply units. The plurality of the powder supply units are connected to the powder replenishment device by pipes arranged in parallel. Pressurized air from the pressure source is used to supply powder to the plurality of powder supply units.

The pressure source generates a high pressure to create and air flow in the pipes sufficient for moving the powder through the pipes. Therefore, the piping must be highly resistant to high pressure. Also, the portions where separate pipes are connected together need to be maintained with a proper seal. The configuration for maintaining the seal becomes complicated to withstand the high pressure in the pipes.

Japanese Laid-Open Patent Application (Kokai) No. SHO-63-272720 discloses a configuration for transporting powder using a flow of air caused by suction force generated by a suction unit. Utilization of the negative pressure can avoid problems attendant to the utilization of highly positive pressure.

However, in these conventional configurations for replenishing powder from the powder replenishment device to each of the plurality of powder supply units, the plurality of powder supply units are connected in parallel with respect to the powder replenishment device whether the configuration is for supplying powder by pressurized air or by suction of air. This parallel construction requires branch pipes for distributing powder from the powder replenishment device to the individual powder supply units. This complicates the piping arrangement for transporting powder. Further, a switching valve for switching transport of powder to each of the powder supply units must be provided to each powder supply unit or to each branch pipe portion. This can make the overall cost of piping expensive.

SUMMARY OF THE INVENTION

It is therefore, an object of the present invention to overcome the above-described problems and to provide an improved powder supply system having a simple structure without employment of the switching valve.

Another object of the present invention is to provide an improved powder supply unit available for the powder supply system.

These and other objects of the present invention will be attained by providing a powder supply system for supplying powders to a plurality of processing devices including a powder replenishment device, a powder suction device, a plurality of powder supply units, and a powder sensor. The powder replenishment device stores therein powders. The powder suction device is adapted for suckingly discharging the powders in the powder replenishment device. The plurality of powder supply units are connected in series and are positioned between the powder replenishment device and the powder suction device. The plurality of powder supply units include an upstream end powder supply unit and a downstream end powder supply unit, each powder supply unit being provided for supplying powders to each processing device. Each powder supply unit includes an auxiliary tank, a powder inlet conduit, a powder outlet conduit, and a powder supplying portion. The auxiliary tank is adapted for temporarily storing therein the powders. The powder inlet conduit is connected to an upper portion of the auxiliary tank for introducing powders into the auxiliary tank. The powder outlet conduit is connected to the upper portion of the auxiliary tank for discharging the powders from the auxiliary tank. The powder supplying portion is provided at a lower portion of the auxiliary tank for supplying the powders conveyed from the auxiliary tank to each processing device. The inlet conduit of the upstream end auxiliary tank is connected to the powder replenishment device and the outlet conduit of the downstream end auxiliary tank is connected to the powder suction device. The powder suction device sucks the powders in the powder replenishment device through the inlet conduits and the outlet conduits and through the respective auxiliary tanks for successively and fully accumulating powders in the auxiliary tanks in the order from the upstream end auxiliary tank to the downstream end auxiliary tank. The powder sensor is connected downstream of the downstream end powder supply unit for detecting a full accumulation of the powders in all auxiliary tanks and for stopping operation of the powder replenishment device and the powder suction device as a result of the powder detection.

In another aspect of the invention, there is provided a powder supply unit connected to a powder source for supplying powders to a processing device, the powder supply unit including a powder reservoir, a powder supplying portion, an auxiliary tank, a powder inlet conduit, a powder outlet conduit, and a valve. The powder reservoir is adapted for temporarily storing powders therein. The powder supplying portion is connected between a lower end of the powder reservoir and the processing device. The auxiliary tank is connected to an upper end of the powder reservoir. The powder inlet conduit is connected to an upper portion of the auxiliary tank for introducing powders into the auxiliary tank. The powder outlet conduit is connected to the upper portion of the auxiliary tank for discharging the powders from the auxiliary tank. The valve is provided at the lower portion of the auxiliary tank and movable between a close position for accumulating the powders in the auxiliary tank and an open position for dropping the powders in the auxiliary tank into the powder reservoir.

DETAILED DESCRIPTION OF THE PREFERRED EMBODIMENTS

A powder supply system according to a first embodiment of the present invention will be described with reference to FIGS. 1 through 5.

Figure 1:
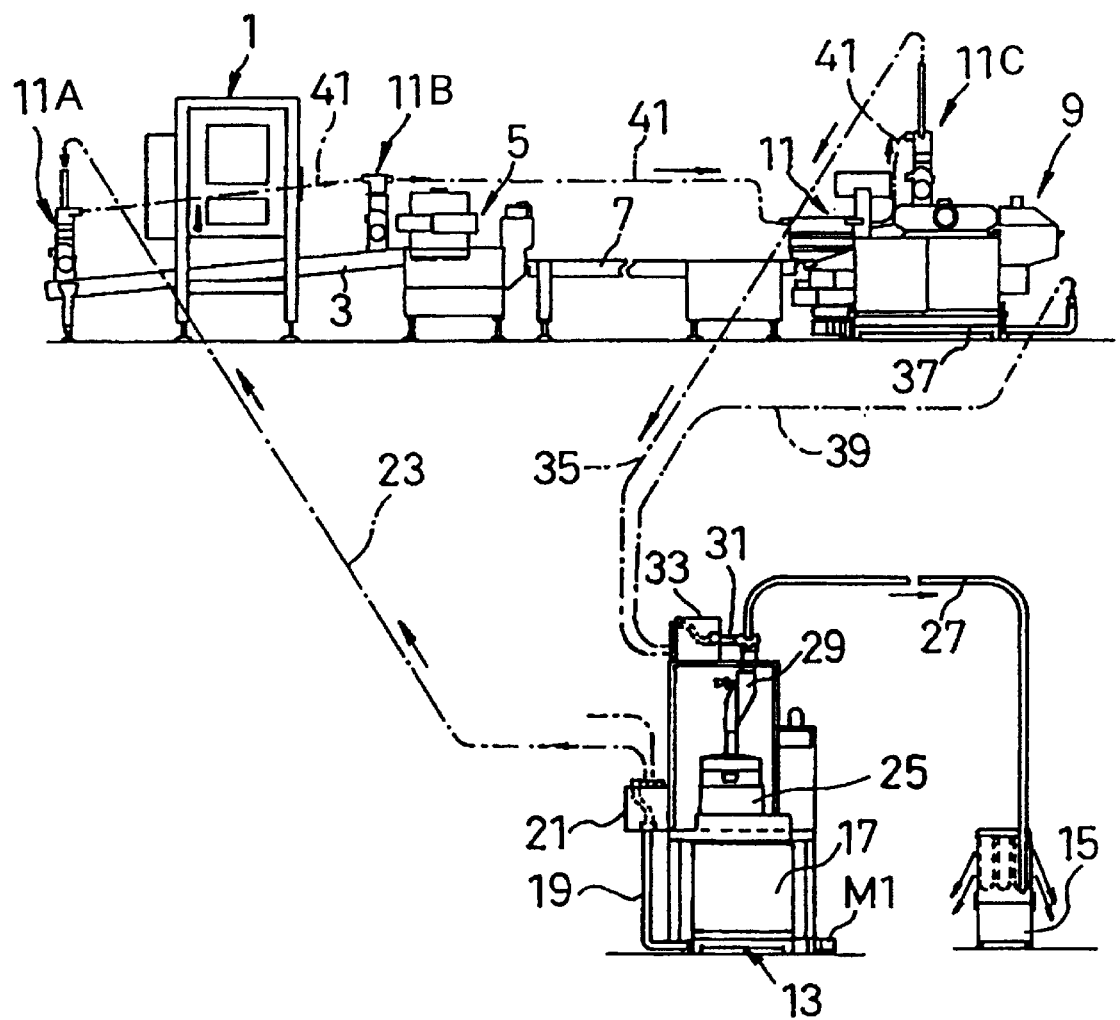
FIG. 1 is a schematic view showing an overall configuration of a powder supply system according to a first embodiment of the present invention.

FIG. 1 is a conceptional view showing a production line for producing breads and other baked goods. Powder supply units 11A to 11C are provided for supplying powder to respective processing devices along the production line. The production line includes a powder replenishment device 13, for replenishing the powder to the powder supply units 11A to 11C.

More specifically, the production line includes a dough supply machine 1, a first stretcher 5, and a second stretcher 9 those disposed in this order from left to right as viewed in FIG. 1. A first conveyer belt 3 is disposed to extend from an upstream side of the dough supplying machine 1, under the dough supplying machine 1, and to the first stretcher 5. Also, a second conveyer belt 7 is disposed between the first stretcher 5 and the second stretcher 9.

The dough supply machine 1 serves as a first processing device for supplying dough, which serves as a material to be processed. The first conveyer belt 3 is provided as a transport unit for transporting the dough from the dough supply machine 1 to the first stretcher 5, where a successive process is performed. The first stretcher 5 serves as a second processing device and is disposed at the final transport position of the first conveyer belt 3. The second conveyer belt 7 is disposed in connection with the first stretcher 5 and is provided for transporting the dough stretched out in the first stretcher 5 to the second stretcher 9. The second stretcher 9 serves as a third processing device and is disposed at the transport end of the second conveyer belt 7.

In other words, the production line is provided with a dough supplying machine 1 for supplying a material to be processed, a transport means for transporting the material from the dough supplying machine 1 to a successive process, and a second and third process machines for performing appropriate processes on the material transported by the transport means. The transport means and the second and third process machines are appropriately disposed in the production line.

The powder supply units 11A, 11B, and 11C are disposed at a plurality of locations as needed along the production line and are all connected in series one after another along the production line via a connection pipe 41. The powder supply units 11A to 11C serve as powder sprinkling units, for sprinkling powder for powdering the surface of dough to prevent the dough from sticking to components of the processing devices 1, 5, and 9.

The powder supply unit 11A is disposed upstream from the dough supply machine 1 at the starting edge of the first conveyer belt 3. Because the powder supply unit 11A is disposed furthest upstream of all the powders supply units in the production line, the powder supply unit 11A will alternately be referred to as the upstream end powder supply unit 11a hereinafter.

The powder supply unit 11B is disposed at the end side of the first conveyer belt 3, that is, at the position where the first conveyer belt 3 finishes transporting the dough to the entrance to the first stretcher 5. The powder supply unit 11B will alternately be referred to as the middle powder supply unit 11B, hereinafter.

The powder supply unit 11C is disposed at the entrance to the second stretcher 9, that is, at the end of the conveyor belt 7 where the dough is introduced into the second stretcher 9. Because the powder supply unit 11C is disposed furthest downstream of all the powders supply units in the production line, the powder supply unit 11C will alternately be referred to as the downstream end powder supply unit 11C, hereinafter.

As mentioned previously, the powder replenishment device 13 is provided for supplying powder to the powder supply units 11A to 11C. The powder replenishment device 13 is connected at its output end to the upstream end powder supply unit 11A via a connection pipe 23. The powder replenishment device 13 is connected at its input end to the downstream end powder supply unit 11C via a connection pipe 35.

A suction unit 15 is provided in connection with the downstream end powder supply unit 11C via the powder replenishment device 13. The suction unit 15 is for generating a suction force or negative pressure to supply powder to the powder supply units 11A to 11C and draw excess supplied powder back to the powder replenishment device 13.

A powder collection device 37 for collecting residual powder supplied from the powder supply units is disposed beneath the second stretcher 9. The powder replenishment device 13 is also connected to the powder collection device 37 via a connection pipe 39. Further, the suction unit 15 is also connected to the powder collection device 37.

The powder replenishment device 13 includes a holding body 17, a switching valve 21, a switching valve 33, a cyclone classifier 29, and a sieve device 25. Although not shown in the drawings, the holding body 17 has an internal hopper for storing powder to be supplied. Also, a rotatable pipe having a length corresponding to the length of the hopper rotatably extends in a horizontal direction at the bottom of the hopper. Suction ports or slits for sucking up powder from the hopper are formed in a spiral configuration in the rotatable pipe. A motor M1 is provided for rotating the rotatable pipe. The arrangement of the hopper and the rotatable pipe is disclosed in a co-pending U.S. patent application Ser. No. 08/789,128 disclosure of which is hereby incorporated by reference.

The switching valve 21 is connected to the rotatable pipe by a connection pipe 19 and to the upstream end powder supply unit 11A by the connection pipe 23. Said differently, the connection pipe 19 has one end connected to the rotatable pipe in the hopper and another end connected to the switching valve 21. The switching valve 21 is for switching supply from the powder replenishment device 13 between to the production line of FIG. 1 and to another system (not shown).

The switching valve 33 is connected to the downstream side of the production line of FIG. 1, that is, to the downstream end powder supply unit 11C, via the connection pipe 35, and also to the powder collection device 37 via the connection pipe 39. The switching valve 33 can be controlled to selectively switch connection of the powder replenishment device 13 to either the downstream end powder supply unit 11C (the connection pipe 35) or to the powder collection device 37 (the connection pipe 39).

The cyclone classifier 29 and the sieve device 25 are provided for separating the collected powder from any dough particles, or other solid materials collected with the powder from the production line before returning the collected powder back to the hopper in the powder replenishment device 13. The cyclone classifier 29 is connected to the switching valve 33 and to the suction unit 15. Said in more detail, the cyclone classifier 29 has an inlet port 31 connected to the switching valve 33. The cyclone classifier 29 has a discharge port 29P (FIG. 5) connected to a connection pipe 27, which is connected to the suction unit 15. The sieve device 25 is disposed above and connected to the cyclone classifier 29. The sieve device 25 supplies the separated powder back to the hopper.

With this configuration, when the powder replenishment device 13 and the suction unit 15 are driven to operate, powder supplied from the powder replenishment device 13 is drawn by suction force generated at the suction unit 15 and is supplied to the upstream end powder supply unit 11A, to the middle powder supply unit 11B, and to the downstream end powder supply unit 11C, one after another in this order. With this configuration, powder can be supplied where needed without the powder being ejected out of the supply system and sprayed around the production line. As a result, area around the production line can be maintained in a sanitary condition.

Figure 2:
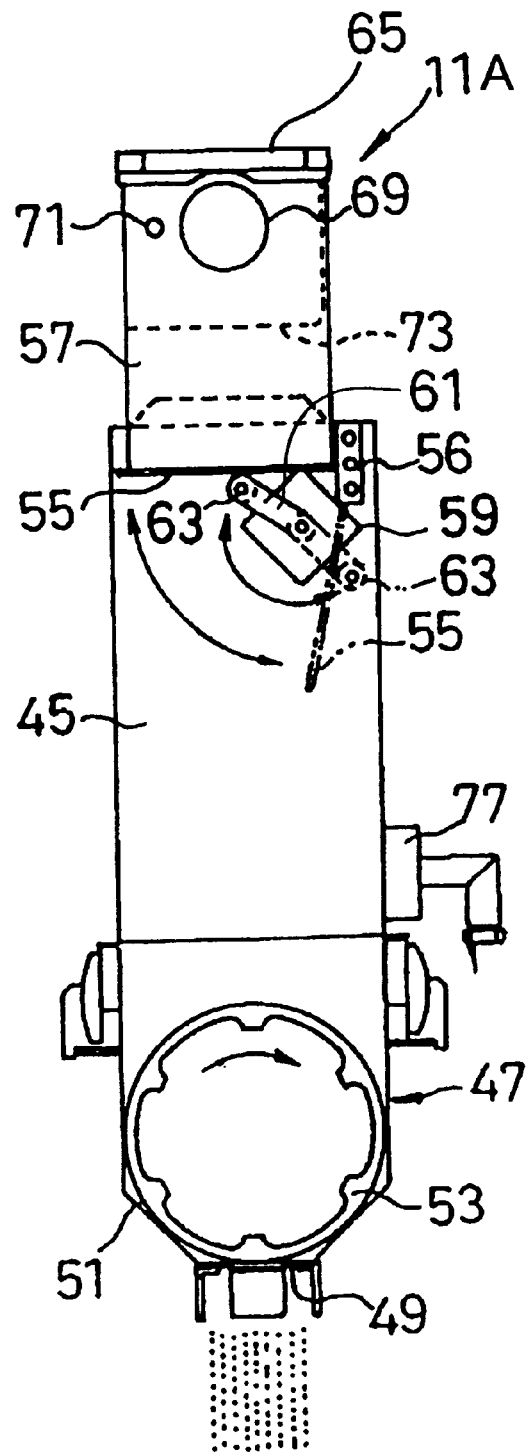
FIG. 2 is a side view showing a powder supply unit according to the first embodiment of the present invention.

Next, the powder supply units 11A through 11C will be described with reference to FIGS. 2 through 4, using the powder supply unit 11A as a representative example. However, it should be noted that the configuration of all the powder supply units 11A through 11C are basically the same.

The powder supply unit 11A generally includes an auxiliary tank 57, a box-shaped powder reservoir 45 disposed beneath the auxiliary tank 57 for storing powder, and a powder supplying portion 47 disposed beneath the reservoir 45 for supplying the powder to the processing device 1.

The auxiliary tank 57 has a relatively deep box shape and includes a shutter 55, which serves as the bottom of the box shape. The auxiliary tank 57 has an internal volume capable of performing a continuous powder supply from the powder supplying portion 47 for ten minutes provided that all powders in the auxiliary tank 57 are dropped into the powder supplying portion 47. A lid 65 is detachably provided at the top of the auxiliary tank 57.

Figure 3:
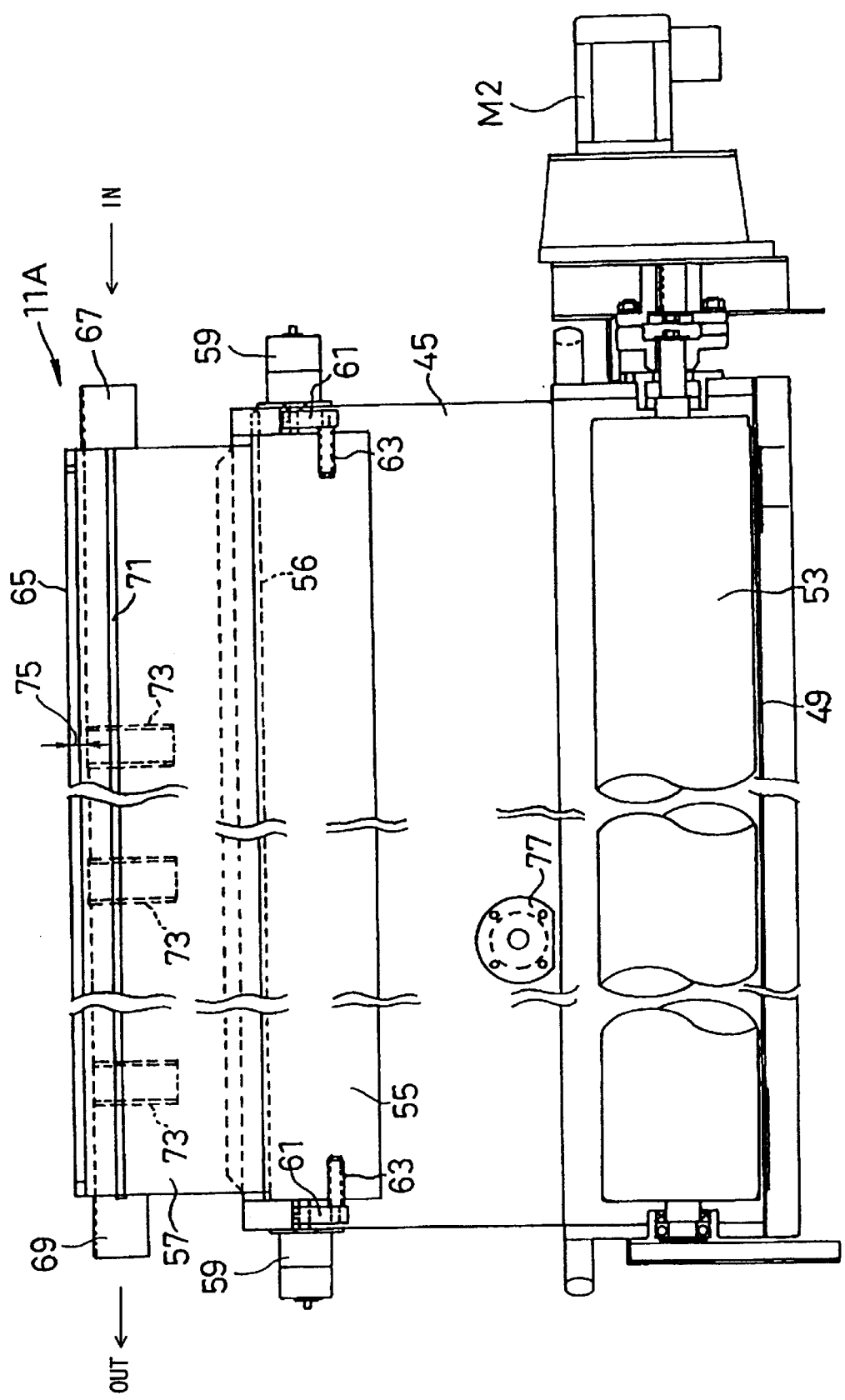
FIG. 3 is a front view partly in cross-section showing the powder supply unit of FIG. 2.
Figure 4:
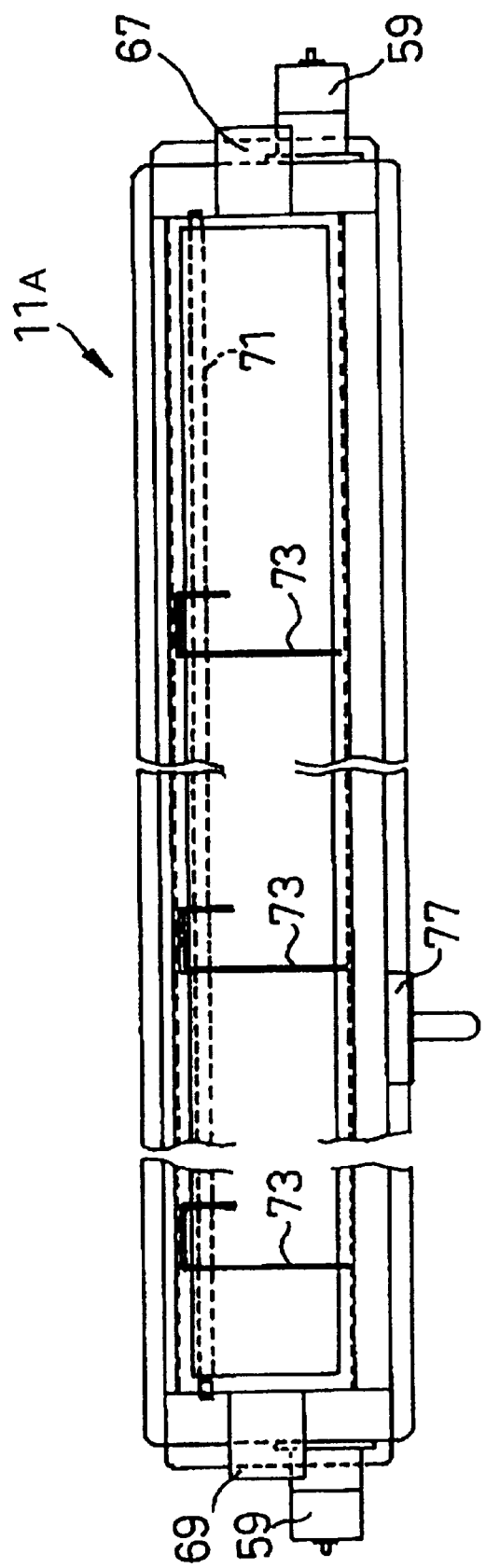
FIG. 4 is a plan view showing the powder supply unit of FIG. 2.

As shown in FIG. 3, an inlet conduit 67 for connecting to the powder replenishment device 13 is disposed at one end of the upper portion of the auxiliary tank 57. An outlet conduit 69 for connecting to the suction unit 15, that is, via the other powder supply units 11B and 11C, is disposed at the other end of the upper portion of the auxiliary tank 57.

A support bar 71 is provided to the upper portion of the auxiliary tank 57. The support bar 71 extends parallel to the direction in which powder is transported and spans from the inlet conduit 67 to the outlet conduit 69. A plurality of partitions 73 for intentionally obstructing smooth flow of powder from the inlet conduit 67 to the outlet conduit 69 are disposed along the support bar 71.

The partitions 73 are configured so that their positions on the support bar 71 can be adjusted. That is, as shown in FIG. 4, the partitions 73 according to the present embodiment are formed in a substantially U shape. The partitions 73 are formed to develop an urging force that resiliently spreads open the U-shaped portion. The support bar 71 penetrates through the substantially U-shaped portion of each partition 73. The urging force fixes the partitions 73 on the support bar 71. However, the user can move each partition 73 along the support bar 71 by slightly pinching closed the U-shaped portion against the urging force of the U-shaped portion and then sliding the partition along the support bar 71. Further, a relatively large space 75 is defined between the upper portion of the partitions 73 and the lid 65 for facilitating the flow of powders through the space 75. That is, even after one auxiliary tank is filled up, powder can be easily transported to the next auxiliary tank.

A pivot shaft 56 is provided at the upper portion of the powder reservoir 45, and the shutter 55 is pivotally disposed on the shaft 56. Thus, the shutter 55 can pivot upward and downward to selectively partition the auxiliary tank 57 from the powder reservoir 45. While the shutter 55 is closed, powder accumulates in the auxiliary tank 57 by operation of the partitions 73. Opening the shutter 55 releases the accumulated powder into the powder reservoir 45.

A rotary actuator 59, a crank arm 61 and a pressing roller 63 are provided for opening and closing the shutter 55. The rotary actuator 59 is provided at the powder reservoir 45 and has a rotation shaft. The crank arm 61 has a free end rotatably provided with the pressing roller 63, and another end attached to the rotation shaft. The pressing roller 63 is disposed in abutment with the surface of the shutter 55. With this configuration, the shutter 55 can open by its own weight, and can then be closed by appropriate pivotal movement of the crank arm 61.

The amount of powder in the powder reservoir 45 gradually decreases because the powder supply portion 47 supplies powder in the powder reservoir 45 to a corresponding processing device. A level sensor 77 is provided at a lower limit position in the powder reservoir 45 to detect when the amount of powder remaining in the powder reservoir 45 is at a lower limit. When the level sensor 77 detects that the powder in the powder reservoir 45 has dropped to the lower limit position, the rotary actuator 59 is driven to open the shutter 55 so that powder in the auxiliary tank 57 drops into the powder reservoir 45.

The powder supply portion 47 is for supplying powder from the powder reservoir 45 to the corresponding stage in the production line. The powder supply portion 47 includes a casing 51, a cylindrical rotor 53, and a motor M2. The casing 51 is attached integrally to the bottom of the powder reservoir 45. A mesh 49 is provided as a bottom portion of the casing 51. The rotor 53 is rotatably provided in the casing 51. The rotor 53 is for moving the powder from inside the powder reservoir 45 to the position of the mesh 49. The motor M2 is provided to the casing 51 for rotating the rotor 53.

With the above-described configuration, when the suction unit 15 and the powder replenishment device 13 are operated, powder supplied from the powder replenishment device 13 is first sucked in through the inlet conduit 67 into the auxiliary tank 57 of the upstream end powder supply unit 11A. Powder introduced into the auxiliary tank 57 through the inlet conduit 67 settles by its own weight and also abuts against the partitions 73 within the auxiliary tank 57, whereupon further movement of the powder toward the outlet conduit 69 is obstructed by the partitions 73. Accordingly, powder within the auxiliary tank 57 gradually accumulates until the auxiliary tank 57 is filled.

When the auxiliary tank 57 of the upstream end powder supply unit 11A fills up with powder, further powder sucked into the auxiliary tank 57 from the inlet conduit 67 passes through the space 75 between the partitions 73 and the lid 65 and flows out through the outlet conduit 69. As a result, the excess powder is sucked into the auxiliary tank 57 of the middle powder supply unit 11B until the auxiliary tank 57 of the middle powder supply unit 11B is filled. This process is also repeated to fill up the auxiliary tank 57 of the downstream end powder supply unit 1C. When the auxiliary tanks 57 of all the powder supply unit 11A, 11B, and 11C are filled with powder, then the excess powder will flow out from the outlet conduit 69 of the auxiliary tank 57 in the downstream end powder supply unit 11C and enter the cyclone classifier 29. The cyclone classifier 29 uses centrifugal force to separate powder from the air flow induced by the suction unit 15. The separated powder is then returned to the holding body 17 of powder replenishment device 13 via the sieve device 25.

According to the configuration of the present embodiment, all of the auxiliary tanks 57 are filled from an empty condition in a few minutes. Therefore, it is desirable to stop drive of the suction unit 15 and the powder replenishment device 13 once the auxiliary tanks 57 become full of powder. To this effect, a powder detection device is provided in the cyclone classifier 29. The powder detection device is adapted for detecting when the auxiliary tanks 57 of all the powder supply units 11A through 11C are filled with powder. Drive of the suction unit 15 and of the powder replenishment device 13 are stopped based on detection by the powder detection device. In other words, the powder detection device serves as a powder sensor and means for stopping the operation of the replenishment device 15 and the suction unit 15.

Figure 5:
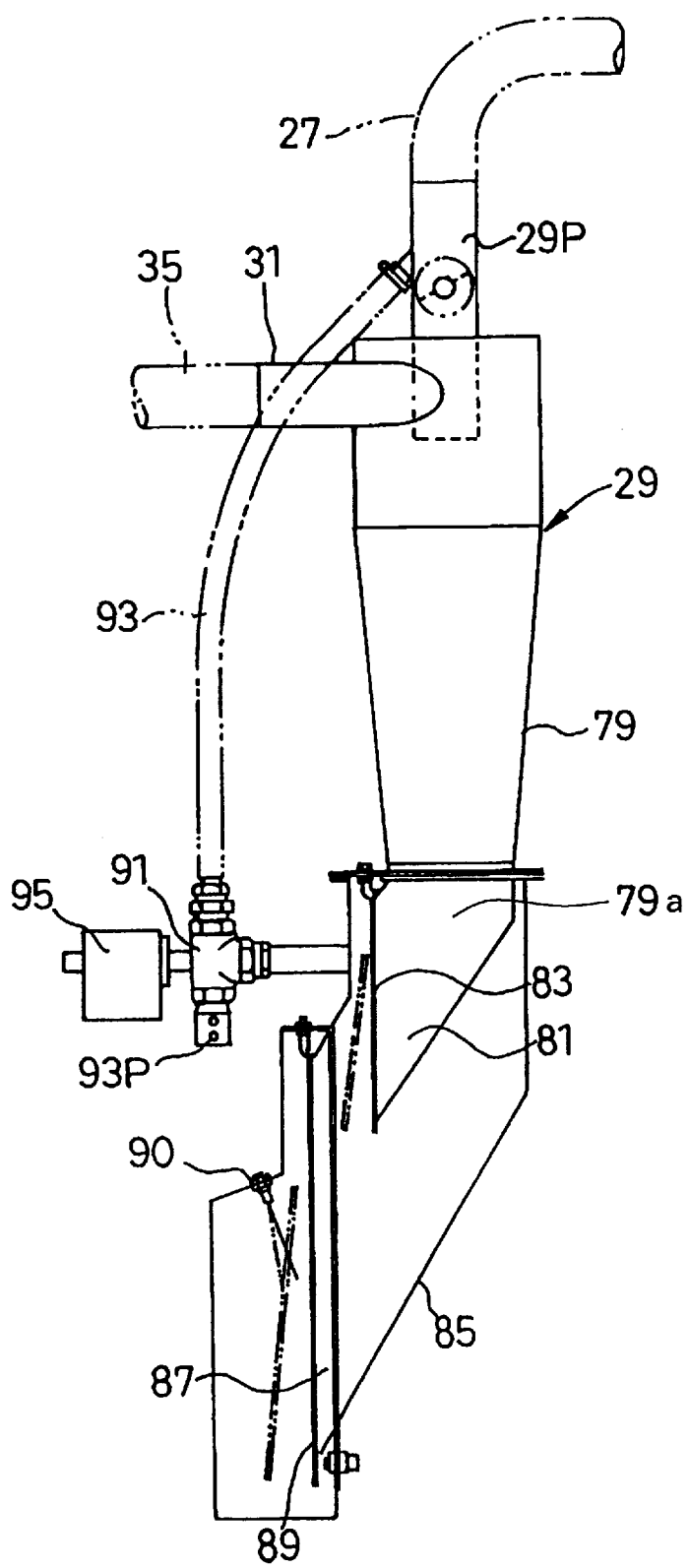
FIG. 5 is a front view showing a cyclone classifier used in the system shown in FIG. 1.

As shown in FIG. 5, the cyclone classifier 29 includes a conical body portion 79 at its lower end. A cylindrical portion 79a with a slanting lower surface is disposed in connection with the lower end of the conical portion 79. A substantially vertical opening 81 is formed in the leftward facing (as viewed in FIG. 5) side of the cylindrical portion 79a. A first shutter 83 is swingably suspended adjacent to the opening 81. The first shutter 83 is swingable between a closed position, which closes the opening 81, and an open position, which opens the opening 81. The first shutter 83 swings into its closed position by its own weight to close the opening 81.

An air chamber wall 85 is provided so as to surround the slanted cylindrical portion 79a and the opening 81. The air chamber wall 85 is in a slanted orientation with respect to the conical portion 79 of the cyclone classifier 29, and defines therein an air chamber space. A substantially vertical opening 87 is formed in the leftward facing (as viewed in FIG. 5) side of the air chamber wall 85. A second shutter 89 is swingably suspended adjacent to the opening 87. The second shutter 89 is swingable between a closed position, which closes the opening 87, and an open position, which opens the opening 87. The second shutter 89 swings into its closed position by its own weight to close the opening 87. The opening 87 is fluidly connected to the sieve device 25 of the power replenishment device 13 when the second shutter 89 is opened. Further, a sensor 90 is disposed adjacent to the second shutter 89 for detecting opening movement of the second shutter 89. When the sensor 90 detects the opening movement, the operation of the powder replenishment device 13 and the suction unit 15 are stopped.

A pressure switching valve 91 is connected to the air chamber wall 85. The pressure switching valve 91 includes an atmosphere inlet port 93P and another inlet port connected to the discharge port 29P of the cyclone classifier 29 by a bypass pipe 93. An actuator 95 is provided for operating the pressure switching valve 91 to connect the air chamber space alternately with the bypass pipe 93 and the atmosphere inlet port 93P. The pressure switching valve 91 is operated each time a predetermined duration of time, such as a few seconds, elapses as determined by, for example, a timer.

The first shutter 83 is urged to its closed position by its own weight and by suction force of the suction unit 15 if the air chamber 85 is connected with the atmosphere inlet port 93P. That is, to close the first shutter 83 tight by suction force of the suction unit 15, the pressure switching valve 91 is operated to connect the air chamber 85 with the outside atmosphere through the atmosphere inlet port 93P. The first shutter 83 will close tight because the pressure on the air chamber side of the first shutter 83 will be higher than on the cyclone classifier side. As a result, when all powder supply units 11A to 11C become full of powder so that powder flows out of the auxiliary tank 57 of the downstream end powder supply unit 11C and into the cyclone classifier 29, the powder will accumulate in the cyclone classifier 29 at a position adjacent to the opening portion 81.

To maintain the closed position of the first shutter 83 merely by the weight of the first shutter 83, the pressure switching valve 91 is operated to connect the air chamber 85 with the suction unit 15 through the bypass pipe 93 and the connection pipe 27. As a result, the pressure at both inner and outer sides of the first shutter 83 will be in equilibrium so that the first shutter 83 is closed by its own weight only. If powder has accumulated in the cyclone classifier 29 at this time, the first shutter 83 will be opened by weight of the accumulated powder so that the accumulated powder drops into the air chamber 85.

When the pressure switching valve 91 is operated to connect the air chamber 85 with atmosphere, so that the first shutter 83 closes tight, the air chamber 85 will be disconnected from the suction unit 15. As a result, pressure at both inner and outer surfaces of the second shutter 89 will equalize so that the second shutter 89 will be closed only by its self weight. Therefore, when powder drops out of the cyclone classifier 29 by opening of the first shutter 83 and accumulates in the air chamber 85, the second shutter 89 will be opened up by weight of the powder.

In other words, when all powder supply units 11A to 11C become full of powder so that powder flows out of the auxiliary tank 57 of the downstream end powder supply unit 11C and into the air chamber 85, the powder in the air chamber 85 will open up the second shutter 89 when the pressure switching valve 91 is operated to connect the air chamber 85 with atmosphere. Because the sensor 90 detects when the second shutter 89 opens, it can detect when all the powder supply units 11A to 11C are full. Operation of the powder replenishment device 13 and the suction unit 15 are stopped in response to the detection signal from the sensor 90, i.e., when the sensor 90 detects that the second shutter 89 opens.

On the other hand, when pressure switching valve 91 is operated to connect the air chamber 85 to the suction unit 15 through the bypass pipe 93, a negative pressure develops in the air chamber 85. The second shutter 89 shuts closed tight because of higher pressure the outer side of the second shutter 89. In this case, powder will not drop out of the air chamber 85, even if powder has accumulated adjacent to the second shutter 89. Since powders to be detected is confined in the air chamber wall 85, whether the auxiliary tanks have each been filled up can be detected without any problem even if powder floats upward when being drop down.

With the above described configuration, first the auxiliary tanks 57 of all of the powder supply units 11A to 11C are filled up with powder. While the powder is supplied from the powder supplying portion 47 of one of the powder supply units to the corresponding processing device in the production line, the amount of powder in the powder reservoir 45 of one of the powder supply units gradually decreases. When the amount of powder in the particular powder supply unit decreases to the level of the level sensor 77, the level sensor 77 will detect that the amount of powder has decreased to the lower limit, whereupon the rotary actuator 59 is operated to open the shutter 55 so that powder accumulated in the auxiliary tank 57 falls into the powder reservoir 45.

When a predetermined duration time elapses after the shutter 55 opens up, the rotary actuator 59 operates in reverse to close the shutter 55. When the shutter 55 closes, the powder replenishment device 13 and the suction unit 15 are again driven to replenish powder into the empty auxiliary tank 57 or tanks.

Accordingly, the auxiliary tank 57 of all the powder supply units 11A to 11C can be maintained in a filled condition. Therefore, powder can be promptly supplied from the auxiliary tank 57 into the powder reservoir 45 in accordance with reduction of powder in the powder reservoir 45.

In this way, according to the first embodiment of the present invention, the powder supply units are connected in series and the suction operation of the suction device sucks powder into auxiliary tanks to fill the auxiliary tanks of the powder supply units one at a time in order starting from the upstream end auxiliary tank. Therefore, there is no need to provide branch piping or switching valves to switch between different pipes of the branch piping. Thus, configuration of piping is simplified. Further, because powder is transported by a suction operation, the powder will not be blown around so that area around the system can be maintained in a more sanitary condition.

The embodiment discloses a configuration for supplying powder by dropping powder from the auxiliary tank 57 down into the powder reservoir 45. The shutter 55 is operated to open when the level sensor 77 detects that the amount of powder in the powder reservoir 45 has reduced to a lower limit. According to the present embodiment, powder can be supplied to completely fill all the auxiliary tanks 57 in a matter of minutes. However, the powder in the powder reservoirs 45 can be supplied by the corresponding powder supplying portions 47 for several tens of minutes before the amount of powder in the powder reservoirs 45 decreases to the lower limit as detected by the level sensors 77. For this reason, the powder supply units 11A to 11C can be configured so that all the shutters 55 of all the powder supply units 11A to 11C are operated simultaneously every several tens of minutes. This can be achieved by providing a valve opening control device using a timer to control the shutter 55 to open each time a predetermined time set by the timer elapses. Thus, powder can be supplied to the powder reservoir 45 each time a predetermined duration of time elapses, so that shortages of powder in the powder reservoir 45 can be prevented.

Even if the amount of powder held in different powder reservoirs 45 decreases at different rates, the reduced amount in each will be replenished when the corresponding shutter 55 is operated to open. The auxiliary tanks 57 of the powder supply units 11A to 11C are filled up in order from the upstream end powder supply unit 11A to the downstream end powder supply unit 11C. Therefore, there is no problem in filling powder into each auxiliary tank 57.

Figure 6:
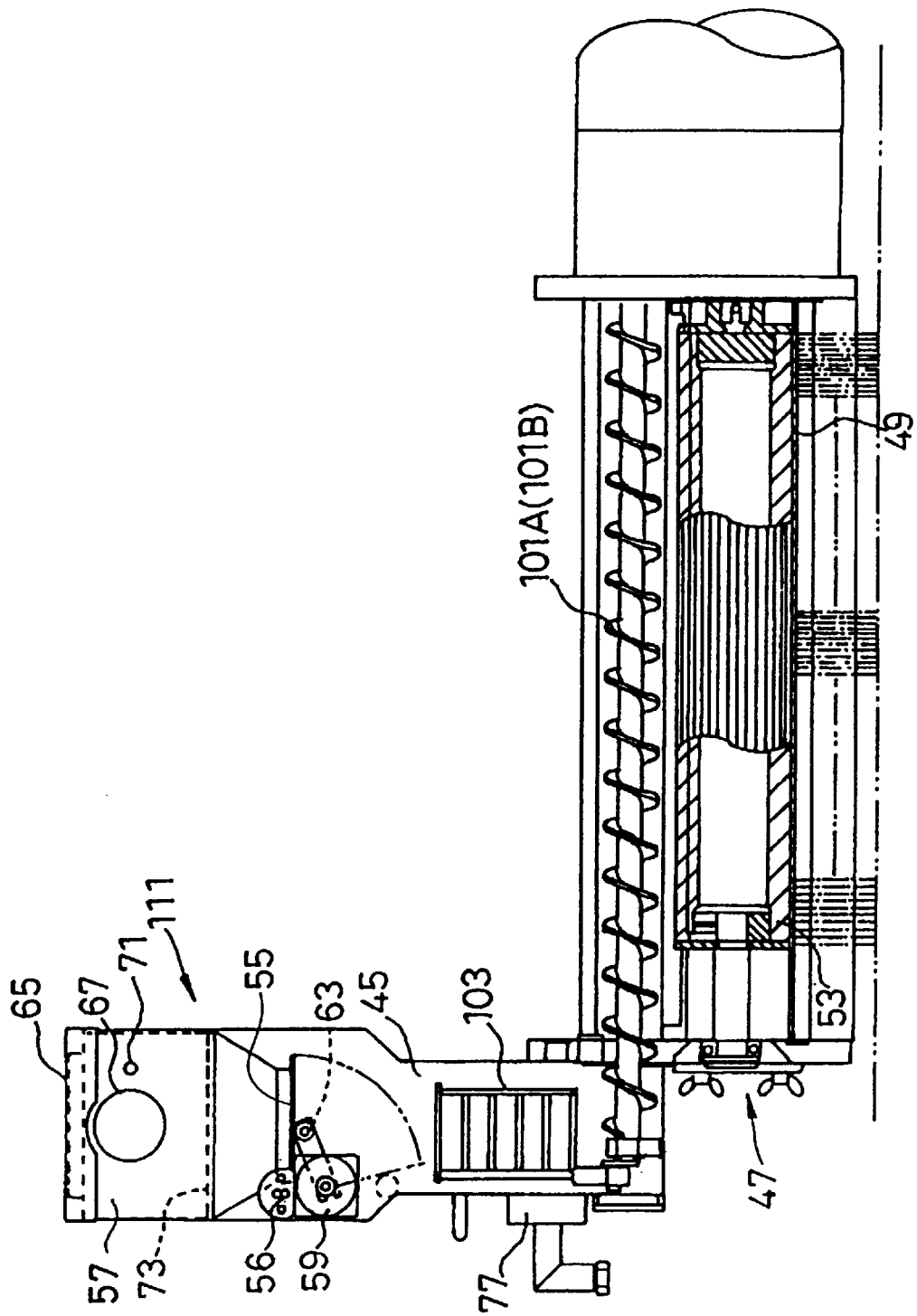
FIG. 6 is a cross-sectional side view showing a powder supply unit according to a second embodiment of the present invention.
Figure 7:
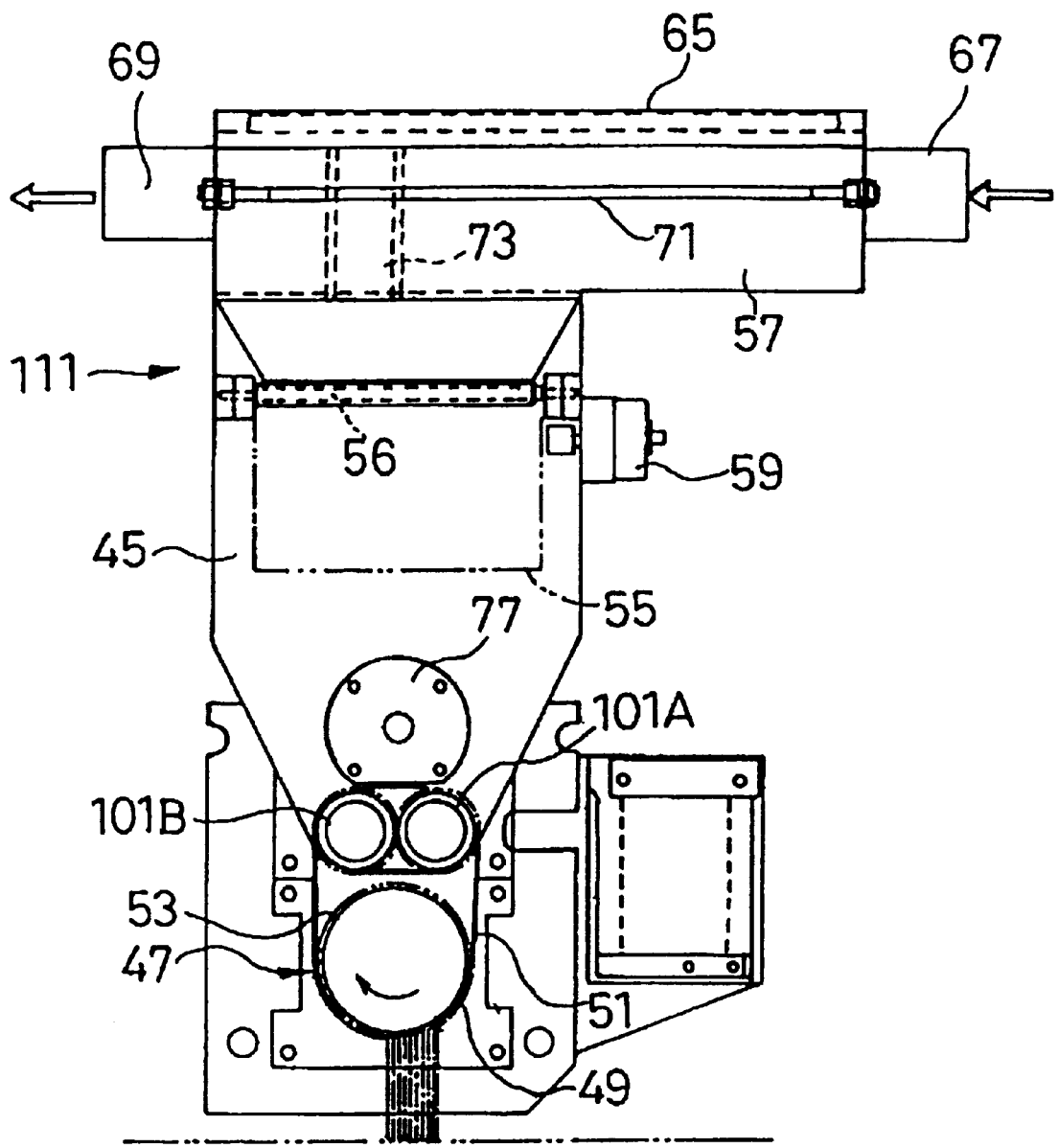
FIG. 7 is a front view showing the powder supply unit of FIG. 6.

Next, a powder supply unit 111 according to a second embodiment of the present invention will be described while referring to FIGS. 6 and 7. To avoid duplication of the description, the powder supply unit 111 of the second embodiment will be described wherein like parts and components are designated by the same reference numerals as the powder supply units 11A to 11C of the first embodiment.

The powder supply unit 111 has a powder supplying portion 47 disposed to extend in a direction that intersects the direction in which powder is transported. That is, the powder supplying portion 47 extends in a direction that intersects the direction in which the inlet conduit 67 and the outlet conduit 69 are aligned to connect to the auxiliary tank 57. In the second embodiment, the powder supplying portion 47 is disposed perpendicular to the direction in which powder is transported. A pair of screw conveyers 101A, 101B are rotatably disposed above the rotor 53 in the powder supplying portion 47. The pair of screw conveyers 101A, 101B are provided for transporting powder in the powder reservoir 45 to above the rotor 53.

Even though both the pair of screw conveyers 101A, 101B can be configured to also transport powder in the powder reservoir 45 up above the rotor 53, one of the screw conveyers can be configured to transport powder in the powder reservoir 45 above the rotor 53 and the other screw conveyer can be configured to transport powder in the reverse direction so that powder is distributed evenly. Further, in order to prevent arching phenomenon, that is, non-uniform deposition, in the powder within the powder reservoir 45, a swinging or vibrating lattice-shaped oscillating member 103 is provided internally in the powder reservoir 45 111 for vibrating the powder.

The powder supply unit 111 according to the second embodiment is advantageous when the positioning of the surrounding equipment does not enable aligning the lengthwise directions of the auxiliary tank 57 and the powder supplying portion 47.

While the invention has been described in detail and with reference to the specific embodiments thereof, it would be apparent to those skilled in the art that various changes and modifications may be made therein without departing from the spirit and scope of the invention.

For example, in the above described embodiment, the powder detection device is provided in the cyclone classifier 29. However, it should be noted that the powder detection device can alternatively be provided anywhere between the auxiliary tank 57 of the downstream end powder supply unit 11c and the suction unit 15 in order to detect outflow of powder from the downstream end powder supply unit 1C. For example, the powder detection device could be provided to a portion of the connection pipe 35 or at the outlet port 69 of the auxiliary tank 57 in the downstream end powder supply unit 11C.

Further, the above-described embodiment describes detecting when all the powder supply units 11A to 11C become full of powder, by using the sensor 90 to detect opening operation of the second shutter 89. However, whether all the powder supply units 11A to 11C are full could be detected based on opening and closing of the first shutter 83 instead. Further, whether all the powder supply units 11A to 11C are full could be detected using a variety of configurations for detecting when powder accumulates at the opening portions 81, 87. For example, a configuration provided with a switch operating by weight of the accumulated powder or a configuration for optically detecting the accumulated powder could be used.

Further, in the above-described embodiments, the inlet conduits 67 and the outlet conduits 69 are disposed in connection with the auxiliary tank 57 substantially aligned on the same imaginary axis so that flow of the powder is substantially linear. However, the inlet conduit and the outlet conduit need not be disposed aligned on the same imaginary axis. For example, the inlet conduit and the outlet conduit need only be disposed near the lengthwise ends of the auxiliary tank without concern for directionality of the inlet conduit with respect to the outlet conduit. That is, the inlet conduit and the outlet conduit can be disposed to guide flow of powder to backtrack in a U-turn fashion or to turn left or right following L-shaped bends.

Also, the partitions 73 need not be provided, although they are desirably provided to assist in uniformly accumulating the powder within the auxiliary tank 57.

What is claimed is:

1. A powder supply system for supplying powders to a plurality of processing devices comprising:

a powder replenishment device storing therein powders;

a powder suction device for suckingly discharging the powders in the powder replenishment device;

a plurality of powder supply units connected in series and positioned between the powder replenishment device and the powder suction device, and comprising an upstream end powder supply unit, and a downstream end powder supply unit, each powder supply unit being provided for supplying powders to each processing device, and each powder supply unit comprising:

an auxiliary tank for temporarily storing therein the powders, the auxiliary tank having an upper portion and a lower portion;

a powder inlet conduit connected to the upper portion of the auxiliary tank for introducing powders into the auxiliary tank;

a powder outlet conduit connected to the upper portion of the auxiliary tank for discharging the powders from the auxiliary tank; and a powder supplying portion provided at the lower portion of the auxiliary tank for supplying the powders conveyed from the auxiliary tank to each processing device, the inlet conduit of the upstream end auxiliary tank being connected to the powder replenishment device and the outlet conduit of the downstream end auxiliary tank being connected to the powder suction device, the powder suction device sucking the powders in the powder replenishment device through the inlet conduits and the outlet conduits and through the respective auxiliary tanks for successively and fully accumulating powders in the auxiliary tanks in the order from the upstream end auxiliary tank to the downstream end auxiliary tank; and a powder sensor connected to a downstream of the downstream end powder supply unit for detecting a full accumulation of the powders in all auxiliary tanks and for stopping operation of the powder replenishment device and the powder suction device as a result of the powder detection.

2. A powder supply system as claimed in claim 1, wherein each of the powder supply units further comprises a powder reservoir provided immediately below the auxiliary tank and immediately above the powder supplying portion; and wherein the lower portion of the auxiliary tank is provided with a valve movable between a close position for accumulating the powders in the auxiliary tank and an open position for dropping the powders in the auxiliary tank into the powder reservoir.

3. The powder supply system as claimed in claim 2, wherein the powder sensor is provided at a position between the downstream end powder supply unit and the powder suction device for detecting the powders flowed from the outlet conduit of the downstream end powder supply unit.

4. The powder supply system as claimed in claim 3, further comprising a cyclone classifier provided at a fluid passage between the downstream end powder supply unit and the powder suction device for separating the powders from a suction air, the powder detection device detecting the powders separated by the cyclone classifier.

5. The powder supply system as claimed in claim 4, wherein the cyclone classifier is fluidly connected to the powder replenishment device for returning the powders separated by the cyclone classifier into the powder replenishment device.

6. The powder supply system as claimed in claim 5, wherein the cyclone classifier comprises:

a conical body portion having a lower opening;

an air chamber wall surrounding the lower opening and connected to the power replenishment device, the air chamber wall defining therein an air chamber space;

a first shutter provided to the lower opening and movable between an open position for opening the lower opening and a close position for closing the lower opening;

a second shutter provided to the air chamber wall, the second shutter opening or closing the air chamber space in accordance with flow of the powders through the air chamber wall, the air chamber space being in communication with the powder replenishment device when the second shutter is opened; and a pressure change-over valve connected to the air chamber space for selectively communicating the air chamber space with one of the powder suction device and an atmosphere.

7. The powder supply system as claimed in claim 6, wherein the powder sensor is provided at the air chamber wall for detecting opening movement the second shutter.

8. The powder supply system as claimed in claim 2, further comprising means for starting operation of the powder replenishment device and the powder suction device in response to the closing movement of the valve.

9. The powder supply system as claimed in claim 2, wherein the powder inlet conduits and the powder outlet conduits are arrayed in line in one direction, and the powder supplying portion extends in a direction that intersects the one direction;

and wherein each of the powder supply units further comprises a conveyer disposed over the powder supplying portion for conveying powders from a bottom portion of the powder reservoir to the powder supplying portion.

10. The powder supply system as claimed in claim 9, wherein the conveyer comprises a first screw conveyer for feeding the powder in a first direction and a second screw conveyer extending in parallel with the first screw conveyer for feeding the powder in a second direction opposite to the first direction.

11. The powder supply system as claimed in claim 1, wherein the powder inlet conduits and the powder outlet conduits are arrayed in line in one direction, and the system further comprising a plurality of partition plates disposed in the auxiliary tank and arrayed in the one direction and spaced away from each other for obstructing a smooth flow of powders flowing through the auxiliary tank.

12. The powder supply system as claimed in claim 11, wherein the auxiliary tank has a top wall, the top wall and the partition plates defining a space therebetween for permitting the powders to flow through the space even after the auxiliary tank is filled with powders.

13. The powder supply system as claimed in claim 2, further comprising a level sensor disposed in the powder reservoir for detecting a lower limit level of the powders in the powder reservoir.

14. The powder supply system as claimed in claim 2, further comprising means for controlling opening and closing movement of the valve at an every predetermined time interval.

* * * * *